US012561684B2

(12) United States Patent
Hochma et al.

(10) Patent No.: US 12,561,684 B2
(45) Date of Patent: *Feb. 24, 2026

(54) EVALUATING USER STATUS VIA NATURAL LANGUAGE PROCESSING AND MACHINE LEARNING

(71) Applicant: PayPal, Inc., San Jose, CA (US)

(72) Inventors: Gal Hochma, Tel Aviv (IL); Matias Rotenberg, Tel Aviv (IL); Yael Cohen, Tel Aviv (IL); Ran Yuchtman, Tel Aviv (IL); Shay Elbaz, Tel Aviv (IL); Chen Levkovich, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 144 days.

This patent is subject to a terminal disclaimer.

(21) Appl. No.: 18/630,871

(22) Filed: Apr. 9, 2024

(65) Prior Publication Data

US 2024/0362635 A1 Oct. 31, 2024

Related U.S. Application Data

(63) Continuation of application No. 15/929,850, filed on May 26, 2020, now Pat. No. 11,983,716.

(51) Int. Cl.
*G06Q 20/40* (2012.01)
*G06F 40/35* (2020.01)
(Continued)

(52) U.S. Cl.
CPC ....... *G06Q 20/40145* (2013.01); *G06F 40/35* (2020.01); *G06N 20/00* (2019.01); *G06Q 20/384* (2020.05); *G06Q 40/03* (2023.01)

(58) Field of Classification Search
CPC ............................... G06F 40/35; G06N 20/00
See application file for complete search history.

(56) References Cited

U.S. PATENT DOCUMENTS 6,314,420 B1 11/2001 Lang et al.
7,562,814 B1 7/2009 Shao et al.
(Continued)

FOREIGN PATENT DOCUMENTS

AU 2019372344 A1 5/2021
CA 3002232 A1 10/2018
(Continued)

OTHER PUBLICATIONS

Chang Y.C. et al., "Application of extreme Gradient Boosting Trees In the Construction of Credit Risk Assessment Models for Financial Institutions," Applied Soft Computing Journal, Dec. 2018, vol. 73, pp. 914-920.

*Primary Examiner* — Anne L Thomas-Homescu
(74) *Attorney, Agent, or Firm* — HAYNES AND BOONE, LLP

(57) ABSTRACT

A request is received from a first user of a social interaction platform. The request is a request to acquire a status. In response to the receiving of the request, a database is accessed. The database contains first electronic data pertaining to previous interactions between the first user and other entities of the social interaction platform. The first electronic data is analyzed via one or more Natural Language Processing (NLP) techniques. A first result is obtained based on the analyzing. A machine learning process is executed based at least in part on the first result. Based on the executing of the machine learning process, a determination is made whether to grant or deny the request received from the first user.

20 Claims, 8 Drawing Sheets

800

(51) Int. Cl.
| | | |
|---|---|---|
| *G06N 20/00* | (2019.01) |
| *G06Q 20/38* | (2012.01) |
| *G06Q 40/03* | (2023.01) |

(56) References Cited

U.S. PATENT DOCUMENTS

| | | | |
|---|---|---|---|
| 8,244,532 | B1 | 8/2012 | Begeja et al. |
| 10,095,992 | B1 | 10/2018 | Brestoff et al. |
| 10,382,259 | B2 | 8/2019 | Igarashi |
| 10,402,064 | B1 | 9/2019 | Al-Sallami et al. |
| 10,409,995 | B1 | 9/2019 | Wasiq et al. |
| 10,467,339 | B1 | 11/2019 | Shen |
| 10,878,394 | B1 | 12/2020 | Gjertson et al. |
| 10,977,728 | B1 | 4/2021 | Sanderson et al. |
| 11,080,617 | B1 | 8/2021 | Amit et al. |
| 11,094,020 | B1 | 8/2021 | Lee et al. |
| 11,138,680 | B1 | 10/2021 | Matoba |
| 11,210,730 | B1 | 12/2021 | Woodyard et al. |
| 11,244,382 | B1 | 2/2022 | Woodyard et al. |
| 11,245,777 | B1 | 2/2022 | Czerwinski et al. |
| 11,363,999 | B2 | 6/2022 | Fountaine |
| 2010/0287148 | A1 | 11/2010 | Resnick et al. |
| 2012/0254333 | A1 | 10/2012 | Chandramouli et al. |
| 2017/0075985 | A1* | 3/2017 | Chakraborty ....... G06F 16/3329 |
| 2018/0012163 | A1 | 1/2018 | Smith et al. |
| 2018/0046939 | A1 | 2/2018 | Meron et al. |
| 2018/0069752 | A1 | 3/2018 | Igarashi |
| 2018/0165362 | A1 | 6/2018 | Engelko et al. |
| 2018/0176380 | A1 | 6/2018 | McCoy |
| 2018/0262529 | A1 | 9/2018 | Allen |
| 2018/0285775 | A1 | 10/2018 | Bergen |
| 2018/0349473 | A1 | 12/2018 | Smith et al. |
| 2018/0349474 | A1 | 12/2018 | Smith et al. |
| 2018/0350007 | A1 | 12/2018 | Chen et al. |
| 2018/0365753 | A1* | 12/2018 | Fredrich ................ G06Q 10/08 |
| 2019/0043127 | A1 | 2/2019 | Mahapatra et al. |
| 2019/0108449 | A1 | 4/2019 | Johnson et al. |
| 2019/0109878 | A1 | 4/2019 | Boyadjiev et al. |
| 2019/0122139 | A1 | 4/2019 | Perez |
| 2019/0122258 | A1 | 4/2019 | Bramberger et al. |
| 2019/0138920 | A1 | 5/2019 | Lin et al. |
| 2019/0155918 | A1 | 5/2019 | Jaroch |
| 2019/0297031 | A1 | 9/2019 | Basheer et al. |
| 2020/0160196 | A1 | 5/2020 | Ramakrishnan et al. |
| 2020/0184017 | A1 | 6/2020 | Batra et al. |
| 2020/0226606 | A1 | 7/2020 | Du et al. |
| 2020/0258141 | A1 | 8/2020 | Habraken |
| 2020/0265336 | A1 | 8/2020 | Merrill et al. |
| 2020/0293933 | A1 | 9/2020 | Ghosh et al. |
| 2020/0314346 | A1 | 10/2020 | Mukul |
| 2020/0327552 | A1 | 10/2020 | Seshan et al. |
| 2020/0342394 | A1 | 10/2020 | Moore et al. |
| 2020/0372576 | A1 | 11/2020 | Sundaram et al. |
| 2020/0380309 | A1 | 12/2020 | Weider et al. |
| 2020/0380398 | A1 | 12/2020 | Weider et al. |
| 2020/0380399 | A1 | 12/2020 | Weider et al. |
| 2020/0394722 | A1 | 12/2020 | Drangmeister et al. |
| 2021/0019839 | A1 | 1/2021 | Su et al. |
| 2021/0082044 | A1 | 3/2021 | Sliwka et al. |
| 2021/0141834 | A1 | 5/2021 | Mac Manus et al. |
| 2021/0165969 | A1 | 6/2021 | Galitsky |
| 2021/0209679 | A1 | 7/2021 | Sanderson et al. |
| 2021/0240742 | A1 | 8/2021 | Wang et al. |
| 2021/0256607 | A1 | 8/2021 | Parmar et al. |
| 2021/0295427 | A1* | 9/2021 | Shiu ........................ G06N 5/04 |
| 2021/0350078 | A1 | 11/2021 | Choudhury et al. |
| 2021/0357591 | A1 | 11/2021 | Campos Ortega et al. |
| 2021/0357729 | A1 | 11/2021 | Leino et al. |
| 2021/0357835 | A1 | 11/2021 | Modi et al. |
| 2021/0360149 | A1 | 11/2021 | Mukul |
| 2022/0058633 | A1 | 2/2022 | Yantis et al. |
| 2022/0191769 | A1 | 6/2022 | Breaux, III et al. |
| 2022/0309109 | A1 | 9/2022 | Benincasa et al. |

FOREIGN PATENT DOCUMENTS

| | | | |
|---|---|---|---|
| EP | 3416123 | A1 | 12/2018 |
| GB | 2558548 | A | 7/2018 |
| WO | 2005052719 | A2 | 6/2005 |

* cited by examiner

Figure 3:
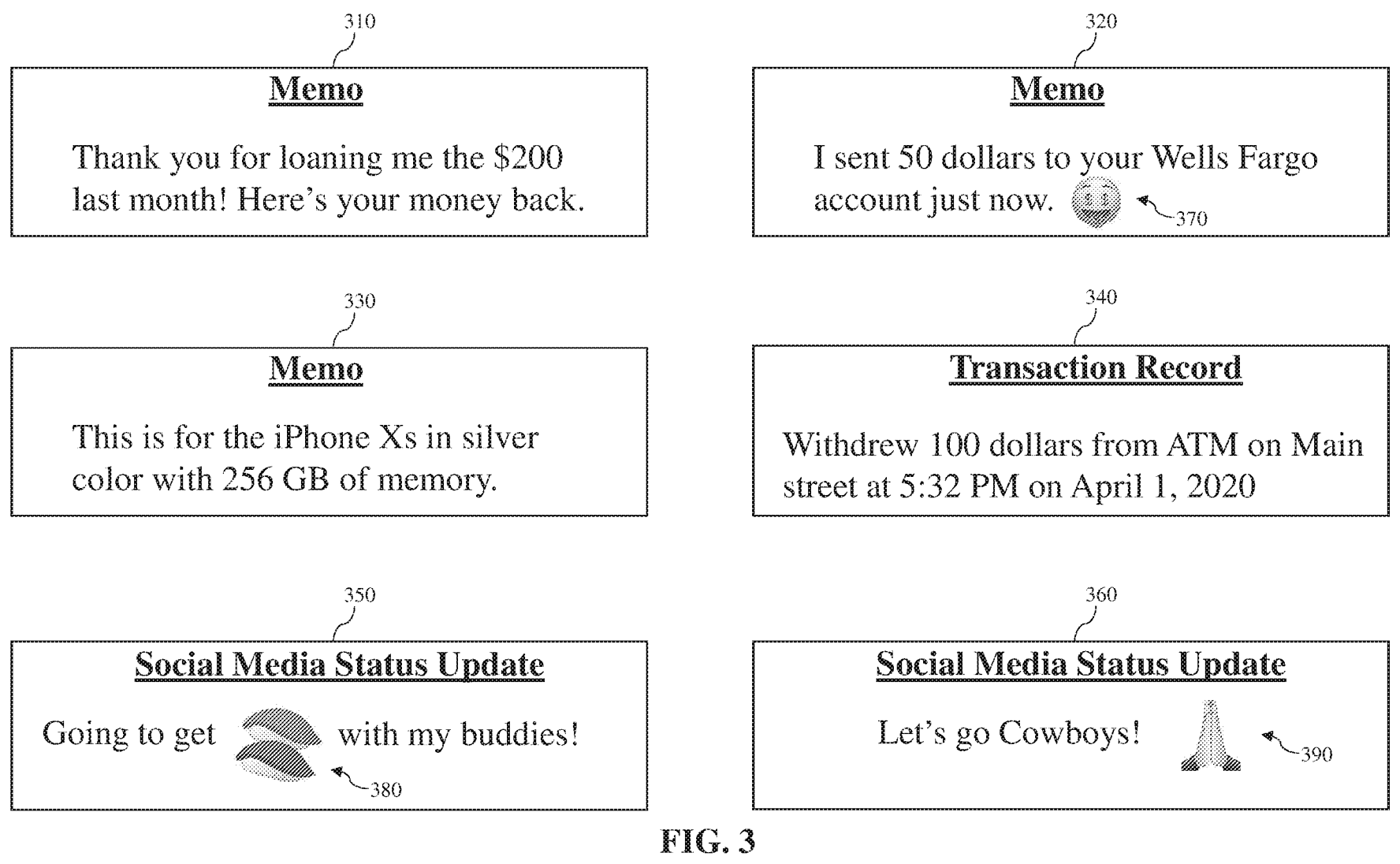

310

Memo

Thank you for loaning me the $200 last month! Here's your money back.

320

Memo

I sent 50 dollars to your Wells Fargo account just now.

370

330

Memo

This is for the iPhone Xs in silver color with 256 GB of memory.

340

Transaction Record

Withdrew 100 dollars from ATM on Main street at 5:32 PM on April 1, 2020

350

Social Media Status Update

Going to get          with my buddies!

380

360

Social Media Status Update

Let's go Cowboys!

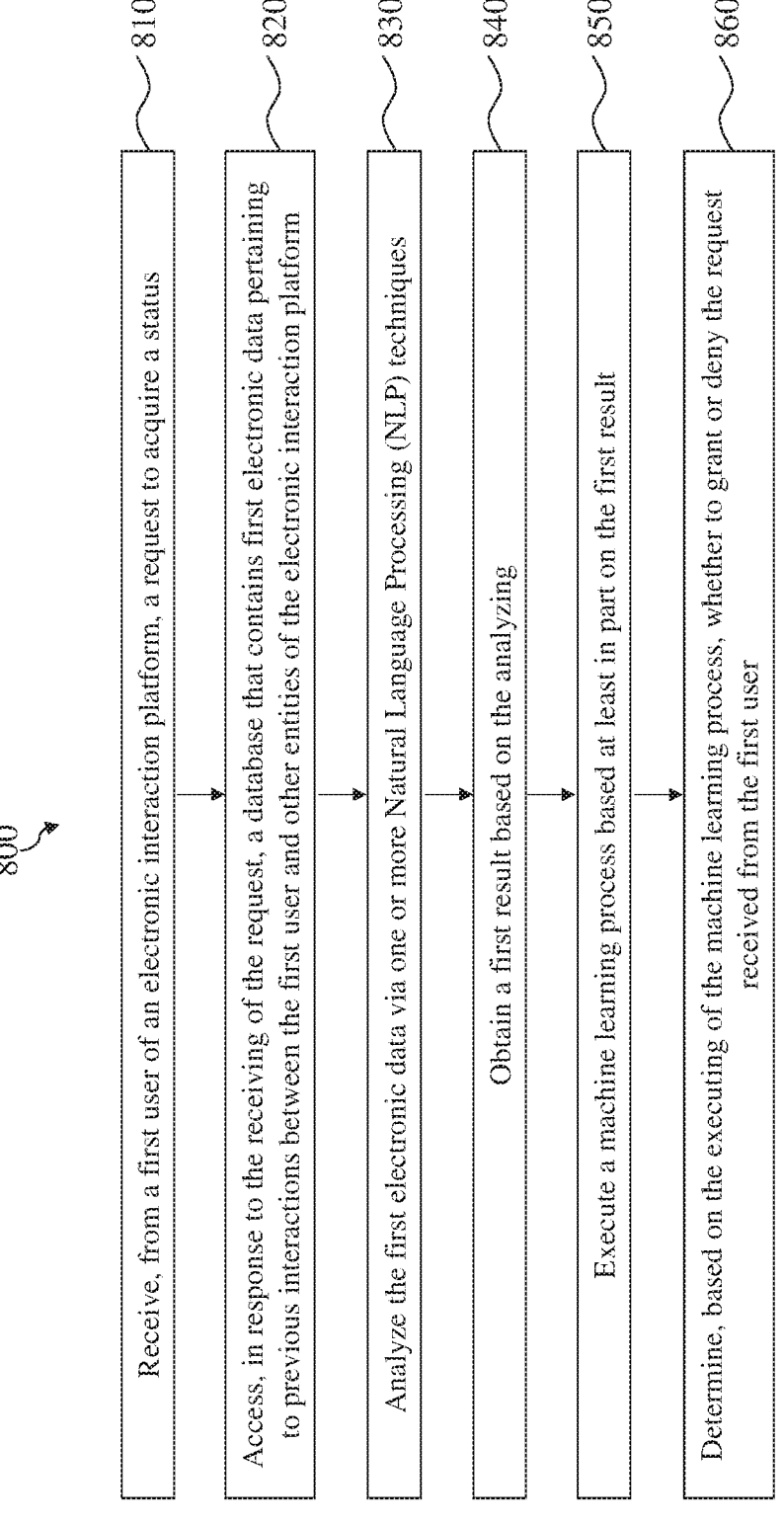

Receive, from a first user of an electronic interaction platform, a request to acquire a status — 810

Access, in response to the receiving of the request, a database that contains first electronic data pertaining to previous interactions between the first user and other entities of the electronic interaction platform — 820

Analyze the first electronic data via one or more Natural Language Processing (NLP) techniques — 830

Obtain a first result based on the analyzing — 840

Execute a machine learning process based at least in part on the first result — 850

Determine, based on the executing of the machine learning process, whether to grant or deny the request received from the first user — 860

EVALUATING USER STATUS VIA NATURAL LANGUAGE PROCESSING AND MACHINE LEARNING

CROSS REFERENCE TO RELATED APPLICATION

The present invention is a Continuation of U.S. patent application Ser. No. 15/929,850, filed May 26, 2020, the disclosure of which is incorporated herein by reference in its entirety.

BACKGROUND

Field of Invention

The present application generally relates to machine learning. More particularly, the present application involves using Natural Language Processing (NLP) techniques to analyze electronic data pertaining to interactions between users of an electronic platform, and then executing machine learning processes on the result of the NLP analysis to determine whether a predefined status can be granted to particular user.

Related Art

Rapid advances have been made in the past several decades in the fields of computer technology and telecommunications. As a result, these advances allow more and more interactions to be conducted electronically. For example, social interaction platforms such as VENMO™, PAYPAL™, or FACEBOOK™ allow their users to conduct transactions with other users or institutions, such as peer-to-peer transfers, electronic payments, Automatic Teller Machine (ATM) withdrawals, etc.

Users may leave memos detailing the transactions, for example, a "thank you" note for paying back borrowed money or a note explaining what goods/services a particular payment is associated with. In addition, at least some of the transactions such as ATM withdrawals may automatically generate electronic records describing certain details (e.g., amount withdrawn, time, and location) of the transactions. When analyzed properly, electronic data pertaining to these transactions (e.g., the memos and/or electronic records) could reveal valuable information of a particular user, such as a creditworthiness of the user. Unfortunately, conventional systems and methods have not been able to conduct such analyses or have not been able to conduct such analyses effectively, especially given the vast amounts of electronic transactions being conducted through various electronic and computing devices.

BRIEF DESCRIPTION OF THE FIGURES

FIG. 3 illustrates simplified graphical portions of textual data according to various aspects of the present disclosure.

FIG. 8 is a flowchart illustrating a method of automatic data extraction from web pages and analysis thereof according to various aspects of the present disclosure.

Figure 1:
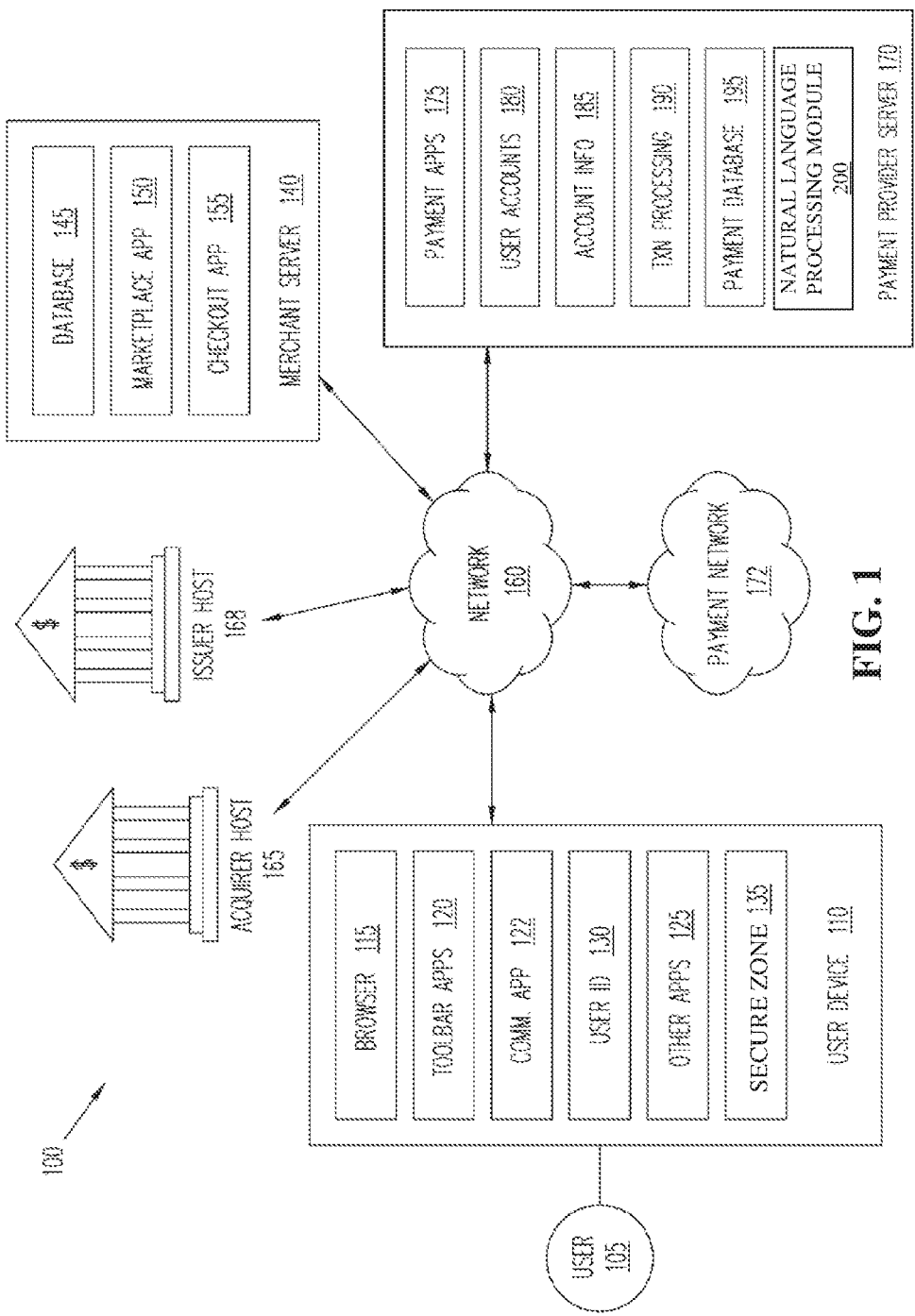
FIG. 1 is a block diagram of a networked system according to various aspects of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

It is to be understood that the following disclosure provides many different embodiments, or examples, for implementing different features of the present disclosure. Specific examples of components and arrangements are described below to simplify the present disclosure. These are, of course, merely examples and are not intended to be limiting. Various features may be arbitrarily drawn in different scales for simplicity and clarity.

The present disclosure pertains to Natural Language Processing (NLP) and machine learning. Recently, social interaction platforms have gained popularity due to their ease of use, ubiquity, and versatility. For example, social interaction platforms such as VENMO™, PAYPAL™, FACEBOOK™, TWITTER™, WECHAT™, or INSTAGRAM™ allow their users to electronically interact with one another, as well as with other entities such as merchant, banks, or other financial institutions. These electronic interactions may include, but are not limited to peer-to-peer transfers, electronic payments for goods or services purchased from merchants, Automatic Teller Machine (ATM) withdrawals, or social media postings (e.g., one user commenting on another user's social media post or feed), etc. Most of these electronic interactions may contain a textual component. For example, users may leave text-based memos or messages detailing certain financial transactions, such as a "thank you" note for paying back borrowed money or a note that links a particular payment with certain goods/services purchased from a merchant. Some of the transactions such as ATM withdrawals may also automatically generate electronic records containing various details of the transactions, such as amount of transaction, time of transaction, and location of transaction. In addition, interactions between users that do not necessarily involve a transaction may nevertheless contain a large amount of textual data. For example, electronic chats, messages, or social media postings/feeds may involve the participation of one or more users and generate textual data. When analyzed properly, the electronic data pertaining to these interactions may reveal valuable user information to interested entities, such as the operators of the social interaction platforms. Unfortunately, conventional systems and methods have not been able to conduct such analyses, or have only conducted analyses that lack sophistication to be of use to the operator of the social interaction platforms.

In contrast to the conventional approaches, the present disclosure involves using a NLP and machine learning process to analyze the textual data associated with the electronic interactions of a user on a social interaction platform. Based on the results of the analysis, certain characteristics of the user may be revealed, which may then be used to determine whether to grant one or more predefined statuses to the user or to take other actions, such as prompting the user to supply additional information. For example, a social interaction platform may determine whether a particular user is deserving of being awarded a predefined status (a credit card, a loan/credit offer, or a certain membership status, such as a VIP status, which may have multiple tiers). In some embodiments, the social interaction platform may initiate such a determination without having received any request from that particular user to apply for such a predefined status. In other embodiments, the social interaction platform may receive a request from a particular user to acquire the predefined status, and in response to receiving such a request, the social interaction platform may make the determination of whether to grant the request. In any case, the process of making such a determination may include at least some of the following steps: the social interaction platform may first access an electronic database that contains electronic data pertaining to the previous interactions between the user (from whom the request is received) and other users or entities that use the social interaction platform. As non-limiting examples, the electronic data may contain textual data, for example textual data based on one or more human languages, and audio data containing audio messages or memos. Note that the textual data may include emojis, or textual data corresponding to emojis.

The social interaction platform may aggregate and then analyze the accessed electronic data via one or more NLP techniques. As non-limiting examples, the NLP techniques may include counters, term frequency-inverse document frequency (TF-IDF), or word2vec. The NLP techniques may reveal the user's language usage patterns, for example, which words are used more frequently by the user in comparison with the general population, and/or which words are more likely to be used by the user in conjunction with other users, etc. To prevent inadvertent discrimination, the NLP analysis herein may also filter out or otherwise remove words that are associated with race, ethnicity, gender, disability, country of origin, religion, or sexual orientation. The various aspects of the NLP analysis will be discussed below in more detail.

Similar NLP techniques may also be performed on a first set of other users who have already been granted the predefined status and/or on a second set of other users who have already been denied the predefined status. For example, the first set of other users have already been granted the credit card, the loan, or the membership status, and the second set of other users have already been denied the credit card, the loan, or the membership status. In some embodiments, the grant or denial of the requests from the first and/or second set of users may be done by human agents, with or without the aid of computer applications.

The first and/or second users may be considered reference users, and the result from the NLP analysis on the first and/or second set of users may be used as training data for one or more machine learning processes that are subsequently performed. Using such training data, the machine learning processes are executed on the results of the NLP analysis on the target user (the user who is requesting to obtain the predefined status). For example, the machine learning processes may learn the similarities or the lack thereof between the language usage patterns (e.g., tendencies to use certain words or phrases) between the target user and the first set of users who have already achieved the predefined status and/or the second set of users who have already been denied the predefined status. In some embodiments, the machine learning processes may generate a score for the target user, where the score may be higher when the target user's language usage pattern is more similar to that of the first set of users and less similar to that of the second set of users. Conversely, the score generated for the target user may be lower when the target user's language usage pattern is more similar to that of the second set of users and less similar to that of the first set of users. The score may then be used to evaluate whether the target user's request to obtain the predefined status should be granted. Note that although the above example involves a consumer request, it is not meant to be limiting. The textual analysis discussed herein may also apply to business users or other business entities that may also generate textual data. For example, a business user or a business entity may generate textual data in business dealings, such as business email exchanges, transcripts of phone calls (e.g., earning calls) that are publicly available, contracts, press releases, or even the social media account postings of business entities. The various aspects of the present disclosure are discussed in more detail with reference to FIGS. 1-8.

FIG. 1 is a block diagram of a networked system 100 or architecture suitable for conducting electronic online transactions according to an embodiment. Networked system 100 may comprise or implement a plurality of servers and/or software components that operate to perform various payment transactions or processes. Exemplary servers may include, for example, stand-alone and enterprise-class servers operating a server OS such as a MICROSOFT™ OS, a UNIX™ OS, a LINUX™ OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

The system 100 may include a user device 110, a merchant server 140, a payment provider server 170, an acquirer host 165, an issuer host 168, and a payment network 172 that are in communication with one another over a network 160. Payment provider server 170 may be maintained by a payment service provider, such as PayPal™, Inc. of San Jose, CA. A user 105, such as a consumer, may utilize user device 110 to perform an electronic transaction using payment provider server 170. For example, user 105 may utilize user device 110 to visit a merchant's web site provided by merchant server 140 or the merchant's brick-and-mortar store to browse for products offered by the merchant. Further, user 105 may utilize user device 110 to initiate a payment transaction, receive a transaction approval request, or reply to the request. Note that transaction, as used herein, refers to any suitable action performed using the user device, including payments, transfer of information, display of information, etc. Although only one merchant server is shown, a plurality of merchant servers may be utilized if the user is purchasing products from multiple merchants.

User device 110, merchant server 140, payment provider server 170, acquirer host 165, issuer host 168, and payment network 172 may each include one or more electronic processors, electronic memories, and other appropriate electronic components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160. Network 160 may be implemented as a single network or a combination of multiple networks. For example, in various embodiments, network 160 may include the Internet or one or more intranets, landline networks, wireless networks, and/or other appropriate types of networks.

User device 110 may be implemented using any appropriate hardware and software configured for wired and/or wireless communication over network 160. For example, in one embodiment, the user device may be implemented as a personal computer (PC), a smart phone, a smart phone with additional hardware such as NFC chips, BLE hardware etc., wearable devices with similar hardware configurations such as a gaming device, a Virtual Reality Headset, or that talk to a smart phone with unique hardware configurations and running appropriate software, laptop computer, and/or other types of computing devices capable of transmitting and/or receiving data, such as an iPad™ from Apple™.

User device 110 may include one or more browser applications 115 which may be used, for example, to provide a convenient interface to permit user 105 to browse information available over network 160. For example, in one embodiment, browser application 115 may be implemented as a web browser configured to view information available over the Internet, such as a user account for online shopping and/or merchant sites for viewing and purchasing goods and services. User device 110 may also include one or more toolbar applications 120 which may be used, for example, to provide client-side processing for performing desired tasks in response to operations selected by user 105. In one embodiment, toolbar application 120 may display a user interface in connection with browser application 115.

User device 110 also may include other applications to perform functions, such as email, texting, voice and IM applications that allow user 105 to send and receive emails, calls, and texts through network 160, as well as applications that enable the user to communicate, transfer information, make payments, and otherwise utilize a digital wallet through the payment provider as discussed herein.

User device 110 may include one or more user identifiers 130 which may be implemented, for example, as operating system registry entries, cookies associated with browser application 115, identifiers associated with hardware of user device 110, or other appropriate identifiers, such as used for payment/user/device authentication. In one embodiment, user identifier 130 may be used by a payment service provider to associate user 105 with a particular account maintained by the payment provider. A communications application 122, with associated interfaces, enables user device 110 to communicate within system 100. User device 110 may also include other applications 125, for example the mobile applications that are downloadable from the App-store™ of APPLE™ or GooglePlay™ of GOOGLE™.

In conjunction with user identifiers 130, user device 110 may also include a secure zone 135 owned or provisioned by the payment service provider with agreement from device manufacturer. The secure zone 135 may also be part of a telecommunications provider SIM that is used to store appropriate software by the payment service provider capable of generating secure industry standard payment credentials as a proxy to user payment credentials based on user 105's credentials/status in the payment providers system/age/risk level and other similar parameters.

Still referring to FIG. 1, merchant server 140 may be maintained, for example, by a merchant or seller offering various products and/or services. The merchant may have a physical point-of-sale (POS) store front. The merchant may be a participating merchant who has a merchant account with the payment service provider. Merchant server 140 may be used for POS or online purchases and transactions. Generally, merchant server 140 may be maintained by anyone or any entity that receives money, which includes charities as well as retailers and restaurants. For example, a purchase transaction may be payment or gift to an individual. Merchant server 140 may include a database 145 identifying available products and/or services (e.g., collectively referred to as items) which may be made available for viewing and purchase by user 105. Accordingly, merchant server 140 also may include a marketplace application 150 which may be configured to serve information over network 160 to browser 115 of user device 110. In one embodiment, user 105 may interact with marketplace application 150 through browser applications over network 160 in order to view various products, food items, or services identified in database 145.

According to various aspects of the present disclosure, the merchant server 140 may also host a website for an online marketplace, where sellers and buyers may engage in purchasing transactions with each other. The descriptions of the items or products offered for sale by the sellers may be stored in the database 145. For example, the descriptions of the items may be generated (e.g., by the sellers) in the form of text strings. These text strings are then stored by the merchant server 140 in the database 145.

Merchant server 140 also may include a checkout application 155 which may be configured to facilitate the purchase by user 105 of goods or services online or at a physical POS or store front. Checkout application 155 may be configured to accept payment information from or on behalf of user 105 through payment provider server 170 over network 160. For example, checkout application 155 may receive and process a payment confirmation from payment provider server 170, as well as transmit transaction information to the payment provider and receive information from the payment provider (e.g., a transaction ID). Checkout application 155 may be configured to receive payment via a plurality of payment methods including cash, credit cards, debit cards, checks, money orders, or the like.

Payment provider server 170 may be maintained, for example, by an online payment service provider which may provide payment between user 105 and the operator of merchant server 140. In this regard, payment provider server 170 may include one or more payment applications 175 which may be configured to interact with user device 110 and/or merchant server 140 over network 160 to facilitate the purchase of goods or services, communicate/display information, and send payments by user 105 of user device 110.

Payment provider server 170 also maintains a plurality of user accounts 180, each of which may include account information 185 associated with consumers, merchants, and funding sources, such as credit card companies. For example, account information 185 may include private financial information of users of devices such as account numbers, passwords, device identifiers, usernames, phone numbers, credit card information, bank information, or other financial information which may be used to facilitate online transactions by user 105. Advantageously, payment application 175 may be configured to interact with merchant server 140 on behalf of user 105 during a transaction with checkout application 155 to track and manage purchases made by users and which and when funding sources are used.

A transaction processing application 190, which may be part of payment application 175 or separate, may be configured to receive information from a user device and/or merchant server 140 for processing and storage in a payment database 195. Transaction processing application 190 may include one or more applications to process information from user 105 for processing an order and payment using various selected funding instruments, as described herein. As such, transaction processing application 190 may store details of an order from individual users, including funding source used, credit options available, etc. Payment application 175 may be further configured to determine the existence of and to manage accounts for user 105, as well as create new accounts if necessary.

According to various aspects of the present disclosure, a Natural Language Processing (NLP) module 200 may also be implemented on the payment provider server 170. The NLP module 200 may include one or more software applications or software programs that can be automatically executed (e.g., without needing explicit instructions from a human user) to perform certain tasks. For example, the NLP module 200 may electronically access one or more electronic databases (e.g., the database 195 of the payment provider server 170 or the database 145 of the merchant server 140) to access or retrieve electronic data about users, such as the user 105. For example, the retrieved electronic data may contain textual information (e.g., corresponding to one or more human languages) that pertains to interactions involving the users, such as interactions among users themselves, or interactions between the users and other entities such as the payment provider server 170, the merchant server 140, the acquirer host 165, or the issuer host 168. As non-limiting examples, the interactions may include user-generated memos describing transactions, user-generated social media exchanges, or automatically-generated electronic records regarding the details of certain transactions (e.g., amount, time, and location of ATM withdrawals).

According to the various aspects of the present disclosure, if the user 105 (as an example user) sends a request (e.g., via the user device 110) to the payment provider server 170 to obtain a predefined status (e.g., a credit card or a premium membership), the NLP module 200 may retrieve the electronic data discussed above from one or more databases and analyze the textual component of the retrieved data using one or more NLP techniques, such as counters, TF-IDF, or word2vec, all of which will be discussed below in more detail. The NLP analysis of the textual component of the electronic data may reveal the user 105's propensities or behavior patterns with respect to words. For example, the NLP analysis may indicate what words or phrases are used more frequently or less frequently by the user 105 compared to other users, and/or the tendencies of the user 105 to link certain words or phrases together (e.g., the usage of one word is frequently accompanied by the usage of another word) compared to other users. In this manner, the NLP module 200 can extract certain features about a user's language usage pattern.

The NLP module 200 may also include a machine learning component that may be used to execute a machine learning process on the NLP analysis results on the user 105's textual data. For example, the training data for such a machine learning process may be the NLP analysis results on one or more groups of reference users, which may include users who have already obtained the predefined status, or users who have already been denied the predefined status. In other words, whatever NLP analysis is done for the user 105's textual data, the same NLP analysis is also done for the reference users, and the result of the analysis is used as training data for the machine learning process. The machine learning process may learn whether the user 105's language usage patterns are more similar to the users who have already obtained the predefined status, or whether the user 105's language usage patterns are more similar to the users who have been denied the predefined status. Based on the machine learning results, a determination can be made as to the user 105's eligibility for the predefined status.

Based on the above, the NLP module 200 can automate the decision-making process for granting or denying a particular user's request to obtain a predefined status. Using state-of-the-art NLP and machine learning techniques, the NLP module 200 may learn the particular user's underlying characteristics (e.g., financial responsibility) via the user's speech or language patterns. In contrast, conventional systems and methods make these types of decisions based on a limited set of ostensible factors such as the user's income, employment status, net worth, credit score, credit history, residence, and/or age. The system 100 of the present disclosure provides more accuracy and versatility than conventional systems and therefore offers an improvement in computer technology.

It is noted that although the NLP module 200 is illustrated as being separate from the transaction processing application 190 in the embodiment shown in FIG. 1, the transaction processing application 190 may implement some, or all, of the functionalities of the NLP module 200 in other embodiments. In other words, the NLP module 200 may be integrated within the transaction processing application 190 in some embodiments. In addition, it is understood that the NLP module 200 (or another similar program) may be implemented on the merchant server 140, on a server of any other entity operating a social interaction platform, or even on a portable electronic device similar to the user device 110 (but may belong to an entity operating the payment provider server 170) as well. It is also understood that the NLP module 200 may include one or more sub-modules that are configured to perform specific tasks. For example, the NLP module 200 may include a first sub-module configured to perform the NLP analysis, as well as a second sub-module configured to perform the machine learning based on the NLP analysis results.

Still referring to FIG. 1, the payment network 172 may be operated by payment card service providers or card associations, such as DISCOVER™, VISA™, MASTERCARD™ AMERICAN EXPRESS™, RUPAY™, CHINA UNION PAY™, etc. The payment card service providers may provide services, standards, rules, and/or policies for issuing various payment cards. A network of communication devices, servers, and the like also may be established to relay payment related information among the different parties of a payment transaction.

Acquirer host 165 may be a server operated by an acquiring bank. An acquiring bank is a financial institution that accepts payments on behalf of merchants. For example, a merchant may establish an account at an acquiring bank to receive payments made via various payment cards. When a user presents a payment card as payment to the merchant, the merchant may submit the transaction to the acquiring bank. The acquiring bank may verify the payment card number, the transaction type and the amount with the issuing bank and reserve that amount of the user's credit limit for the merchant. An authorization will generate an approval code, which the merchant stores with the transaction.

Issuer host 168 may be a server operated by an issuing bank or issuing organization of payment cards. The issuing banks may enter into agreements with various merchants to accept payments made using the payment cards. The issuing bank may issue a payment card to a user after a card account has been established by the user at the issuing bank. The user then May use the payment card to make payments at or with various merchants who agreed to accept the payment card.

Figure 2:
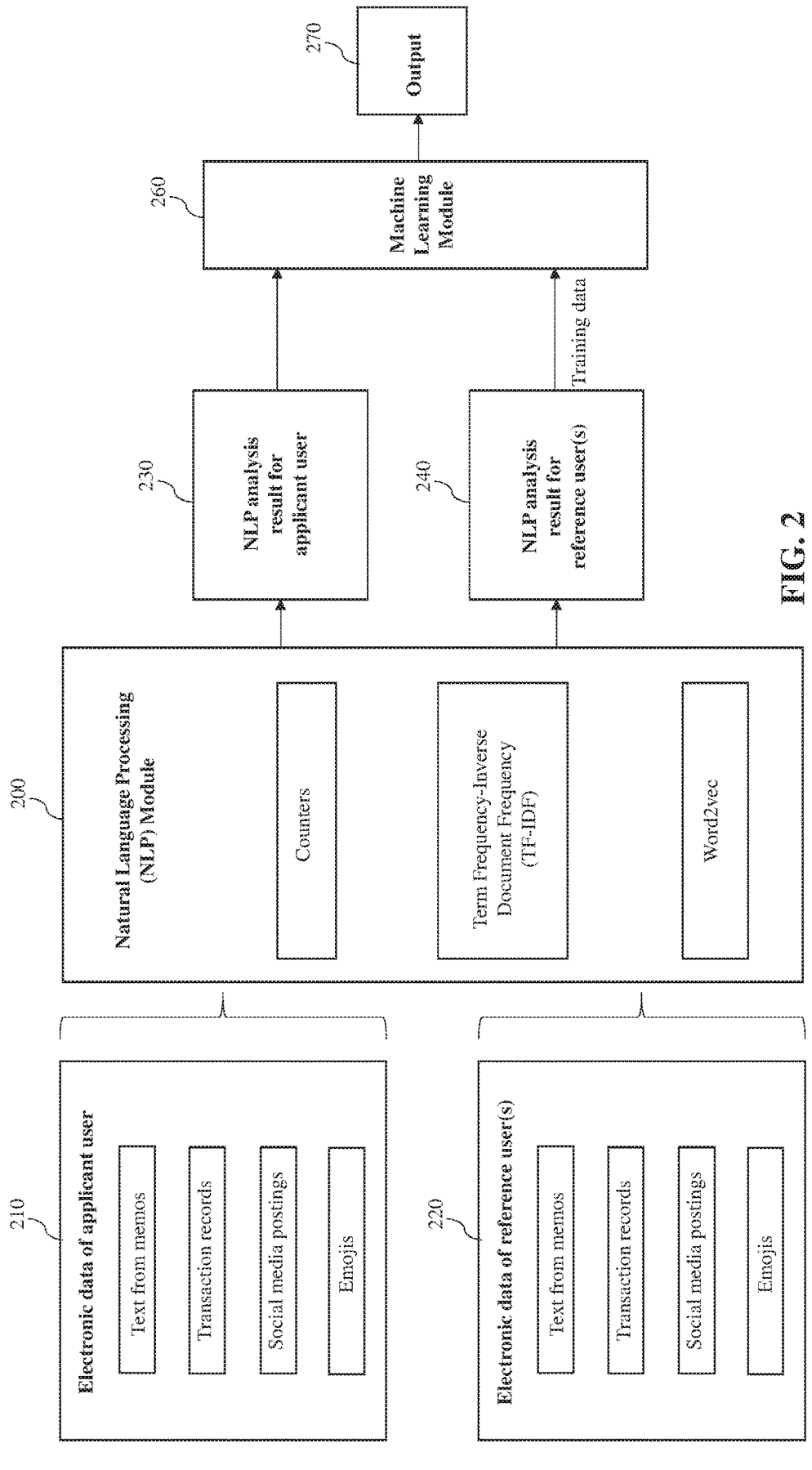
FIG. 2 is a block diagram illustrating a process of performing a Natural Language Processing analysis on textual data and executing a machine learning process according to various aspects of the present disclosure.

FIG. 2 is a simplified block diagram illustrating a process in which the NLP module 200 analyzes the electronic data of users according to embodiments of the present disclosure. Again, the NLP module 200 is implemented on the payment provider server 170 in this embodiment, but it may be implemented on other servers operated by other entities in alternative embodiments. The NLP module 200 (or the server on which it resides) may receive a request from an applicant user (e.g., the user 105 of FIG. 1) to obtain a predefined status. The predefined status may include a line of credit, a credit card, a response to an offer/advertisement, or a certain membership status (e.g., a gold member, a diamond member, a platinum member), etc. The request may come from a mobile application of a web browser via the user device 110.

Upon receiving the request from the applicant user, the NLP module 200 may access one or more databases (e.g., the databases 195 or 145) to retrieve electronic data 210 of the applicant user. The electronic data 210 may contain textual data pertaining to the electronic interactions of the applicant user with other users of a social interaction platform or with other entities such as financial institutions. As non-limiting examples, the electronic data 210 may include text from memos, transaction records, social media postings, or emojis, some non-limiting examples of which are shown in FIG. 3. Note that although the process flow of the present disclosure is initiated in response to receiving the request from the applicant user, this is just a non-limiting example scenario. In other embodiments, the process flow of the present disclosure may be initiated in the absence of receiving a request from any applicant user. In other words, the process flow may, without receiving a user request, evaluate user information, as stated above, to determine if the user qualifies for a predefined status, and, based on this analysis, the predefined status may be granted or offered to the user (for example, the user may be provided with an offer corresponding to the predefined status that the user may choose to accept or reject).

With reference to both FIGS. 2-3, the text from memos may include memos written by the applicant user for various transactions. For example, a memo 310 in FIG. 3 may describe a repayment of a loan to another user, which may state, "Thank you for loaning me the $200 last month! Here's your money back!" A memo 320 may describe a peer-to-peer fund transfer, which may state, "I sent 50 dollars to your Wells Fargo account just now." A memo 330 may describe a payment for goods or services purchased from a merchant or from another user, which may state, "This payment is for the iphone XS in silver color with 256 GB of memory." Note that the above are merely non-limiting examples. In other cases, the memos may not have a direct or indirect reference to a particular transaction. For example, the memos may include just an emoji (without words), or a joke (which may or may not be related to a particular item involved in a transaction), or a pun, or even just commentary regarding the current/present/future status of one or more users.

The transaction records may include textual data that is automatically-generated by machines in response to transactions conducted by the applicant user. As a non-limiting example, the applicant user may withdraw cash from an ATM via a barcode or a Quick Response (QR) code generated by a mobile application of the social interaction platform. In response to the cash withdrawal, an electronic record 340 as shown in FIG. 3 may be generated, which may include the details of the cash withdrawal, such as the monetary amount withdrawn (e.g., 100 dollars), the time and date of the withdrawal (e.g., 5:32 PM on Apr. 1, 2020), and/or the location of the ATM machine (e.g., on Main Street). As another non-limiting example, a purchasing transaction conducted between the applicant user with a merchant may also automatically generate an electronic transaction record that includes details such as the type of goods/services purchased, quantity of goods/services purchased, monetary amount corresponding to the purchase, date and time of the purchase, and the parties involved in the purchase.

The social media postings may include textual data that is generated by the applicant user as a part of a social media interaction. As a non-limiting example, the social media postings may include the applicant user posting a status update, such as a status update 350 of "Going to get Sushi with my buddies!" or a status update 360 of "Let's go Cowboys!" As another non-limiting example, the social media postings may include a comment on another user's social media posting. As yet another non-limiting example, the social media postings may include a chat between two or more users (including the applicant user) of the social interaction platform, which may be done via a chat application.

The emojis may include ideograms and/or graphical symbols (including animations), such as facial expressions (e.g., smiley faces), common objects (e.g., fruits and vegetables), places (e.g., famous landmarks), weather, and/or animals. A user may select one or more emojis from a preexisting library of emojis as a part of a communication message. Each emoji may contain or be associated with textual data, and the textual data can be extracted from the emoji via various commercially available programs or applications, such as Decodemoji™ or Super EmojiTranslater™. In other words, these commercially available programs or applications may receive one or more emojis as an input and produce a string of text as an output. It is understood that although the emojis are listed separately in FIG. 2 from the other forms of example electronic data 210 of the applicant user, it may be embedded in at least some of them, for example, embedded in the text from memos or embedded in the social media postings. As shown in FIG. 3, the memo 320 may include an emoji 370 that is a smiley face with dollar signs, the social media status update 350 may include an emoji 380 that shows two pieces of nigiri-style sushi, and the social media status update 360 may include an emoji 390 that shows two hands pushed together. Some of these emojis, such as the emoji 390, may have multiple meanings or literal translations depending on the specific context, as discussed below in more detail later.

The NLP module 200 of FIG. 2 may also access the one or more electronic databases to retrieve electronic data 220 of one or more reference users. A reference user may be a user who has already been granted the predefined status that the applicant user is requesting to obtain, or the reference user may also be a user who has already been denied the predefined status that the applicant user is requesting to obtain. For example, the reference user may have already applied for the predefined status, and the social interaction platform (which, as discussed above, may include the payment provider server 170 in some embodiments) may have decided whether or not to grant the request for the reference user using one or more human agents, one or more computerized tools, or combinations thereof. The social interaction platform may have made its decision based on factors such as the reference user's annual income, net worth, credit history, credit score, job title, employment status, age, residence, etc. In some embodiments, the social interaction platform may have calculated a score for the reference user based on the above factors, where the score is used to determine whether to grant the request from the reference user. In other embodiments, the social interaction platform and the payment provider server 170 may be separate entities, and the decision of whether to grant the request may be made by the entity that implements the NLP module 200 on its server. For example, the payment provider may make the decision when the NLP module 200 is implemented on the payment provider server. Alternatively, the social interaction platform (e.g., a social media company other than the payment provider) may make the decision when the NLP module 200 is implemented on its server. Also note that although the above example involves a scenario where the decision regarding the predefined status is made in response to receiving the request from the applicant user, it is not intended to be limiting. In other words, the entity (e.g., the payment provider or a social interaction platform that is other than the payment provider) that is making the decision regarding the predefined status make proactively determine whether a given user should be awarded the predefined status, even when that user did not specifically apply for such a status.

As will be discussed in more detail below, the electronic data 220 of the reference user will be used to generate training data for a machine learning process to determine whether the applicant user's request should be granted. To facilitate the machine learning process, in some embodiments, the reference user should be a "clear cut" case of being rewarded the predefined status or being denied the predefined status. For example, a reference user may be a user A who has already been granted the status (e.g., having a credit card). In more detail, the user A has a high annual income (e.g., greater than $500,000), a high credit score (e.g., greater than 800), a steady employment history and a prestigious job title (e.g., a surgeon for over 20 years), etc. Based on these factors, the social interaction platform generated a very high score for the user A, and therefore user A's request to obtain the credit card was easily granted. Thereafter, the user A may be classified as a first type of reference user who should be granted the predefined status, which is the credit card in this case. Other users whose factors are similar to the user A's factors may also grouped into the first type of reference users.

Conversely, a reference user may be a user B who has already been denied the status (e.g., the credit card requested by the applicant user), because the user B has a low annual income (e.g., less than $10,000), a low credit score (e.g., less than 400), a spotty employment history and/or a certain category of job title. Based on these factors, the social interaction platform generated a very low score for the user B, and therefore user B's request to obtain the credit card was easily denied. Thereafter, the user B may be classified as a second type of reference user who should be denied the predefined status, which is the credit card in this case. Other users whose factors are similar to the user B's factors may also grouped into the second type of reference users.

In the machine learning process to be performed later (as will be discussed in more detail below), the goal is to determine whether the applicant user's language usage patterns are similar to those of the first group of reference users (in which case the applicant user's request should be granted), or whether the applicant user's language usage patterns are similar to those of the second group of reference users (in which case the applicant user's request should be denied). The assumption is that language usage patterns may reveal certain characteristics about a user, for example the user's creditworthiness. Thus, the more similar the applicant user's language usage patterns are to the first type of reference users, the more likely the applicant user's request for the predefined status will be granted. Conversely, the more similar the applicant user's language usage patterns are to the second type of reference users, the more likely the applicant user's request for the predefined status will be denied. In embodiments where the reference users only consist of one type of reference users (e.g., only users who have been granted the predefined status, or only users who have been denied the predefined status), the machine learning may yield results on how similar or dissimilar the applicant user's language usage patterns are to those of the reference users. As the degree of similarity increases, the applicant user is more likely to be afforded a status that is the same as the reference users (e.g., a grant of the credit card application, if the reference users have been approved of the credit card). As the degree of similarity decreases, the applicant user is more likely to be afforded a status that is not the same as the reference users (e.g., a denial of the credit card application, if the reference users have been approved of the credit card).

Regardless of how the reference users are determined, the electronic data 220 of the reference users may still contain textual data similar to that discussed above with reference to the applicant user, such as the text from memos, transaction records, social media postings, audio, and/or emojis. The NLP module 200 may perform the same type(s) of NLP analysis on both the electronic data 210 of the applicant user and the electronic data 220 of the reference users. Note that the electronic data 210 may be aggregated electronic data of the applicant user over a predefined period (e.g., the past year, the past month, the past week, etc.), and the electronic data 220 may be aggregated electronic data of the reference users over the same predefined period of time. This is to ensure that there is a sufficient amount of textual data for the NLP analysis.

The details of the NLP analysis will now be discussed in more detail. As non-limiting examples, the NLP analysis may be performed using a counters technique, a term frequency-inverse document frequency (TF-IDF) technique, a word2vec technique, or combinations thereof. The counters technique, as the name suggests, counts the number of a variety of objects in the textual data obtained from a user. The objects may be words, types of words (e.g., nouns, verbs, adjectives, pronouns, adverbs, etc.), symbols (e.g., dollar sign, percentage sign, asterisk, etc.), punctuation marks, typographical errors, or even emojis. In other words, the textual data of a user may be analyzed by the counters technique to determine the number of total words, the number of nouns, the number of verbs, the number of adjectives, the number of pronouns, the number of adverbs, the number of punctuation marks, the number of symbols, the number of typographical errors, or the number of emojis. As a simplified example, the textual data may comprise, "Here is the $20 I owe you for lunch. I really enjoyed that berger. We need to do that again sooon!" Using the counters technique, the NLP module 200 may determine that there are 21 total words in the analyzed textual data, 4 pronouns, 2 typographical errors (e.g., "berger" and "sooon"), 1 symbol (e.g., the dollar sign), 3 punctuation marks, and 0 emojis.

In comparison to counters, when the TF-IDF technique is applied to the textual data of a given user, it generates a numerical statistic that reflects the importance of a word to that user, relative to other users. As such, the TF-IDF technique may be used to assign weights to different words of the user. A TF-IDF weight may be composed of two terms: TF (term frequency) and IDF (inverse document frequency). The first term (TF) computes the normalized term frequency, which may refer to the number of times a word appears in a given user's textual data, divided by the total number of words in the textual data. Expressed mathematically, TF=(number of times a particular word appears in the textual data of a user)/(total number of words in the textual data). The second term (IDF) computes, as a logarithm, the number of the users in a group of users divided by the number of users whose corresponding textual data contains the specific word. Expressed mathematically, IDF=log_e (total number of users/number of users whose textual data contains the particular word).

To illustrate TF-IDF with simplified real world examples, a word such as "stocks" may be used frequently by many users, so even if it is also used frequently by the applicant user, it is not assigned a high weight. However, if the user is frequently using the word "NASDAQ", not only in comparison to the general population of users, but also in relation to how often the user uses words such as "stocks", "DOW", or "S&P500", then the word "NASDAQ" may be assigned a higher weight for the applicant user. This is because the frequent usage of the word "NASDAQ" according to the applicant user's language patterns indicates that it is of particular importance to the applicant user. For example, the applicant user may be more interested in trading technology stocks than stocks in general. As another example, if the word "coke" appears frequently in the applicant's textual data, it may not be weighed very heavily, since many other users may buy or consume Coke™ as well. However, if a word corresponding to a particular hair product (e.g., "L'Oreal") frequently appears in the textual data of the applicant user, it may be assigned a higher weight, because it may indicate a particular brand loyalty of the applicant user or the price range with which the applicant user is comfortable.

Word2vec is yet another way of analyzing the language usage patterns of a user. In more detail, word2vec is a neural net that processes textual data by vectorizing words. For example, an input of a word2vec process may be a body of text (e.g., a particular user's textual data aggregated over a period of time), and an output of the word2vec process may be a set of vectors, for example feature vectors that represent words in that body of text. Therefore, for a given user's textual data, each word in the textual data may have a corresponding vector, and the entirety of the textual data of that user may be represented as a vector-space.

Word2vec may be useful because it can group the vector representations of similar words together in a vector-space, for example, the words "dog" and "cat" may be closer together in vector-space than the words "dog" and "aspirin". This may be done by detecting their similarities mathematically, since mathematical operations may be performed on or using vectors. In this manner, word2vec allows mathematical processing (which is very convenient for computers) on human language data, which may make word2vec well-suited for machine learning. In a simplified example, via the application of word2vec, the words "man", "woman", "king", and "queen" may each have a respective vector representation. By subtracting the vector representation of "man" from the vector representation of "king", and then adding the vector representation of "woman", the result is the vector representation of "queen."

Note that the word2vec needs to be trained for a particular context, for example within the context of electronic interactions between users of a particular social interaction platform. One reason for this is that different words or objects (e.g., emojis) may mean different things in different contexts. As a non-limiting example, the emoji 390 shown in FIG. 3 that appears as two hands pushed together may mean or correspond to the word "pray" in one social interaction platform, but the same emoji may mean or correspond to the phrase "high-five" in another social interaction platform. Therefore, in order to get accurate results, word2vec needs to be trained for a particular context.

It is understood that various embodiments of the present disclosure may selectively remove certain words from the NLP analysis. In some embodiments, words that are related to a user's race, ethnicity, gender, disability, country of origin, religion, or sexual orientation may be filtered out before the NLP analysis is performed, since these words may lead to inadvertent discrimination against the user. For example, if an emoji corresponds to a person's likeness and has a dark skin color, the textual component corresponding to the dark skin color may be removed from the textual data before the NLP analysis is performed. As another example, if the textual data of a user states, "We Mexican women are the best cooks!", the words "Mexican" and "women" may be removed from the textual data before the NLP analysis is performed.

In some other embodiments, stop words may be removed from the textual data before the NLP analysis is performed. In that regard, stop words include a set of words in a given language, where the words are commonly used in that language but do not provide much meaning. In the case of the English language, stop words may include determiners, coordinating conjunctions, and prepositions. Determiners typically mark nouns where a determiner is followed by a noun. For example, determiners may include words like "the", "a", "an", "another", etc. Coordinating conjunctions may include words that connect words, phrases, and clauses. For example, coordinating conjunctions may include words like "and", "for", "nor", "or", "but", "yet", "so", etc. Prepositions may include words that express temporal or spatial relations. For example, prepositions may include "in", "of", "over", "under", "from", "into", "during", "upon", "towards", etc. The removal of the stop words from the NLP analysis allows the NLP analysis to focus on more important words instead. As such, it may improve the accuracy of the NLP analysis. In addition, the removal of the stop words from the NLP analysis also reduces the amount of computer processing power and/or memory storage (e.g., the processors and/or memory of the NLP module 200) needed to perform the analysis. Therefore, the removal of the stop words may also improve the speed and efficiency of the NLP analysis.

Note that the removal of the words such as the user's race, gender, disabilities, as well as the removal of the stop words, may be performed not just for a particular NLP technique, but for all of them or combinations thereof instead. For example, one type of word removal (e.g., just stop words) may be done before the TF-IDF analysis, while another type of word removal (e.g., words pertaining to the user's race, gender, disability, etc.) may be done for the word2vec analysis. Alternatively, both types of word removal may be done for all three types of NLP analysis discussed above.

Still referring to FIG. 2, the NLP analysis performed by the NLP module 200 on the electronic data 210 generates a NLP analysis result 230 for the applicant user, and the NLP analysis performed by the NLP module 200 on the electronic data 220 generates a NLP analysis result 240 for the reference users. The analysis result 230 corresponds to language usage pattern features of the applicant user that has been extracted by the NLP module 200. The analysis result 240 corresponds to language usage pattern features of the reference user that has been extracted by the NLP module 200. As discussed above, the NLP analysis result 240 is used as training data for a machine learning process to be subsequently performed. Since the NLP analysis result 240 is intended to be used as training data, the NLP analysis of the electronic data 220 may be independent of the NLP analysis of the electronic data 210. For example, the NLP analysis of the electronic data 220 may be performed before, during, or after the NLP analysis of the electronic data 210.

In any case, the NLP analysis result 230 and the NLP analysis result 240 are fed into a machine learning module 260 for a machine learning process to be performed, using the NLP analysis result 240 as the training data. In some embodiments, the machine learning module 260 employs a decision tree learning model to conduct the machine learning process. A decision tree learning model uses observations about an item (represented by branches in the decision tree) to make conclusions about the item's target value (represented by leaves in the decision tree). As non-limiting examples, decision tree learning models may include classification tree models, as well as regression tree models. In some embodiments, the machine learning module 260 employs a Gradient Boosting Machine (GBM) model (e.g., XGBoost) as a regression tree model. The GBM model may involve the following elements: 1. A loss function to be optimized; 2. A weak learner to make decisions; and 3. An additive model to add weak learners to minimize the loss function. Additional details of the GBM model are described in https://machinelearningmastery.com/gentle-introduction-gradient-boosting-algorithm-machine-learning/. It is understood that the present disclosure is not limited to a particular type of machine learning. Other machine learning techniques may be used to implement the machine learning module 260, for example via Random Forest or Deep Neural Networks.

The machine learning module 260 may be implemented on the payment provider server 170 of FIG. 1. In some embodiments, the machine learning module 260 may be a part of the NLP module 200 (even though they are illustrated as separate blocks in FIG. 2 for reasons of simplicity and convenience). For example, the NLP module 200 may include a first sub-module that is configured to perform the NLP analysis on the electronic data 210 or the electronic data 220, and the NLP module 200 may also include a second sub-module that is configured to perform the machine learning process. In other words, the functionalities of the first sub-module correspond to those of the NLP module 200 of FIG. 2, and the functionalities of the second sub-module correspond to those of the machine learning module 260 of FIG. 2. In other embodiments, the machine learning module 260 and the NLP module 200 may be implemented as distinctly separate modules, for example as separate modules that both reside within the payment provider server 170, or as separate modules that reside on separate servers.

The machine learning module 260 generates an output 270 as a result of the machine learning process. In some embodiments, the output 270 includes a decision of whether or not to grant the request from the applicant user to obtain the predefined status (e.g., credit card, certain membership status, etc.). For example, the machine learning process performed may learn that the language usage patterns of the applicant user are sufficiently similar to those of reference users who have already been granted the predefined status, and/or are sufficiently dissimilar to those of reference users who have already been denied the predefined status. Accordingly, the output 270 may include a decision to grant the request from the applicant user. Conversely, the machine learning process performed may learn that the language usage patterns of the applicant user are sufficiently similar to those of reference users who have already been denied the predefined status, and/or are sufficiently dissimilar to those of reference users who have already been granted the predefined status. Accordingly, the output 270 may include a decision to deny the request from the applicant user.

In other embodiments, the output 270 may include a score, rather than a decision itself. For example, the machine learning process performed by the module 260 may indicate a degree of similarity between the language usage patterns of the applicant user and the reference users. A greater degree of similarity with the reference users who have been granted the predefined status may yield a higher score, and a lower degree of similarity with the reference users who have been denied the predefined status may also yield a higher score. Conversely, a greater degree of similarity with the reference users who have been denied the predefined status may yield a lower score, and a lower degree of similarity with the reference users who have been granted the predefined status may also yield a lower score.

Figure 4:
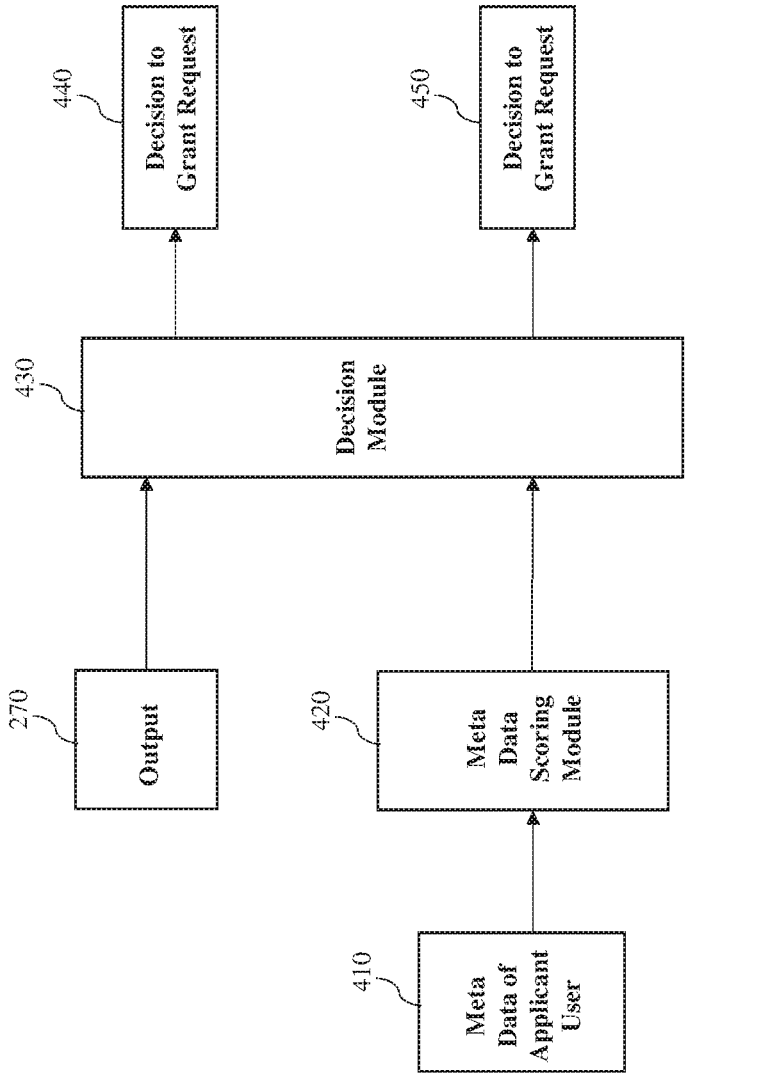
FIG. 4 illustrates a block diagram illustrating how the output of machine learning is used to determine whether to grant user requests according to various aspects of the present disclosure.

Such a score may be considered in conjunction with other factors to evaluate whether to grant or deny the request from the applicant user. For example, the score may be considered in conjunction with meta data of the applicant user. Referring to FIG. 4, meta data 410 of the applicant user may be obtained, for example via accessing one or more of the databases discussed above. As an example, when the predefined status is a credit card, the meta data 410 may be the type of credit card (e.g., type of interest rate, credit limit, rewards available, annual fee, etc.) being applied for, the length of history as a client of the social interaction platform, the number of financial instruments linked to the applicant user's account with the social interaction platform, revenue generated from the applicant user, average amount withdrawn from ATMs per withdrawal, etc.

The meta data 410 may be processed by a meta data scoring module 420, which may also be a module that is implemented on the payment provider server 170 of FIG. 1 in some embodiments. In some embodiments, the meta data scoring module 420 may generate a score for the applicant user as its output based on processing the meta data 410. The output of the meta data scoring module 420 is sent to a decision module 430 along with the output 270. The decision module 430 may also be a module implemented on the payment provider server 170.

Figure 5:
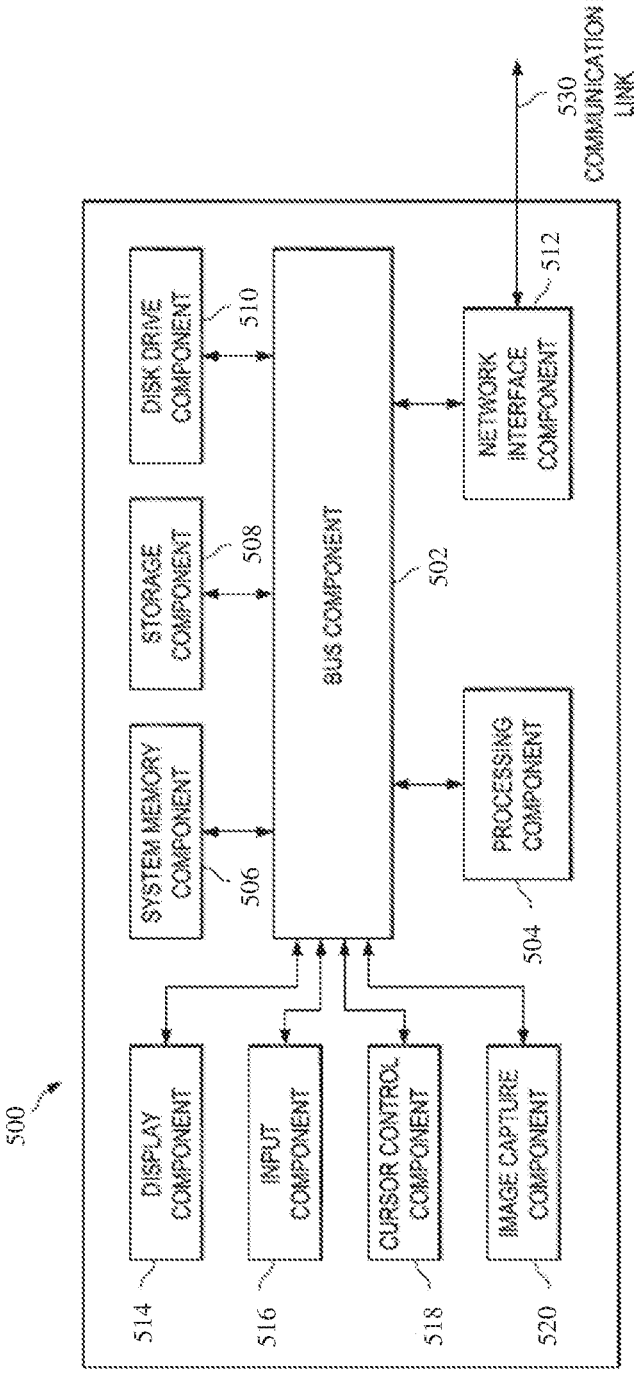
FIG. 5 is an example computer system according to various aspects of the present disclosure.

FIG. 5 is a block diagram of a computer system 500 suitable for implementing various methods and devices described herein, for example, the NLP module 200, the machine learning module 260, the meta data scoring module 420, the decision module 430, the user device 110, the merchant server 140, or the payment provider server 170. In various implementations, the devices capable of performing the steps may comprise a network communications device (e.g., mobile cellular phone, laptop, personal computer, tablet, etc.), a network computing device (e.g., a network server, a computer processor, an electronic communications interface, etc.), or another suitable device. Accordingly, it should be appreciated that the devices capable of implementing the NLP module 200 and the various method steps of the method 800 discussed below (or the user device 110, the merchant server 140, or the payment provider server 170) may be implemented as the computer system 500 in a manner as follows.

In accordance with various embodiments of the present disclosure, the computer system 500, such as a network server or a mobile communications device, includes a bus component 502 or other communication mechanisms for communicating information, which interconnects subsystems and components, such as a computer processing component 504 (e.g., processor, micro-controller, digital signal processor (DSP), etc.), system memory component 506 (e.g., RAM), static storage component 508 (e.g., ROM), disk drive component 510 (e.g., magnetic or optical), network interface component 512 (e.g., modem or Ethernet card), display component 514 (e.g., cathode ray tube (CRT) or liquid crystal display (LCD)), input component 516 (e.g., keyboard), cursor control component 518 (e.g., mouse or trackball), and image capture component 520 (e.g., analog or digital camera). In one implementation, disk drive component 510 may comprise a database having one or more disk drive components.

In accordance with embodiments of the present disclosure, computer system 500 performs specific operations by the processor 504 executing one or more sequences of one or more instructions contained in system memory component 506. Such instructions may be read into system memory component 506 from another computer readable medium, such as static storage component 508 or disk drive component 510. In other embodiments, hard-wired circuitry may be used in place of (or in combination with) software instructions to implement the present disclosure. In some embodiments, the various components of the NLP module 200 may be in the form of software instructions that can be executed by the processor 504 to automatically perform context-appropriate tasks on behalf of a user.

Logic may be encoded in a computer readable medium, which may refer to any medium that participates in providing instructions to the processor 504 for execution. Such a medium may take many forms, including but not limited to, non-volatile media and volatile media. In one embodiment, the computer readable medium is non-transitory. In various implementations, non-volatile media includes optical or magnetic disks, such as disk drive component 510, and volatile media includes dynamic memory, such as system memory component 506. In one aspect, data and information related to execution instructions may be transmitted to computer system 500 via a transmission media, such as in the form of acoustic or light waves, including those generated during radio wave and infrared data communications. In various implementations, transmission media may include coaxial cables, copper wire, and fiber optics, including wires that comprise bus 502.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. These computer readable media may also be used to store the programming code for the NLP module 200 discussed above.

In various embodiments of the present disclosure, execution of instruction sequences to practice the present disclosure may be performed by computer system 500. In various other embodiments of the present disclosure, a plurality of computer systems 500 coupled by communication link 530 (e.g., a communications network, such as a LAN, WLAN, PTSN, and/or various other wired or wireless networks, including telecommunications, mobile, and cellular phone networks) may perform instruction sequences to practice the present disclosure in coordination with one another.

Computer system 500 may transmit and receive messages, data, information and instructions, including one or more programs (i.e., application code) through communication link 530 and communication interface 512. Received program code may be executed by computer processor 504 as received and/or stored in disk drive component 510 or some other non-volatile storage component for execution. The communication link 530 and/or the communication interface 512 may be used to conduct electronic communications between the NLP module 200 and external devices, for example with the user device 110, with the merchant server 140, or with the payment provider server 170, depending on exactly where the NLP module 200 is implemented.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as computer program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein. It is understood that at least a portion of the NLP module 200 may be implemented as such software code.

Figure 6:
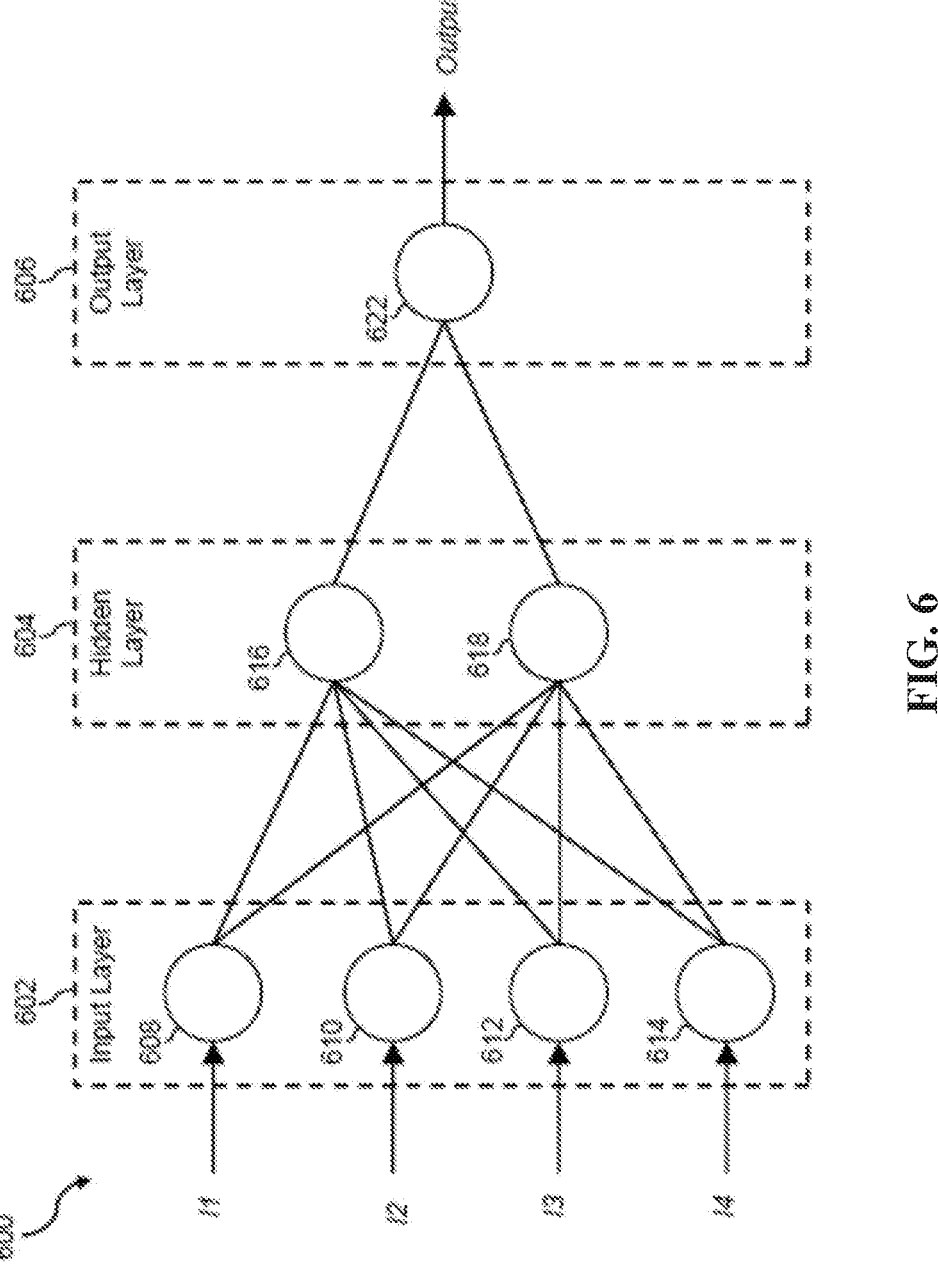
FIG. 6 illustrates an example artificial neural network according to various aspects of the present disclosure.

As discussed above, machine learning is used to determine the degree of similarity between the applicant user and one or more reference users. In some embodiments, the machine learning may be performed at least in part via an artificial neural network, which may used to implement the machine learning module 260 of FIG. 2. In that regard, FIG. 6 illustrates an example artificial neural network 600. As shown, the artificial neural network 600 includes three layers—an input layer 602, a hidden layer 604, and an output layer 606. Each of the layers 602, 604, and 606 may include one or more nodes. For example, the input layer 602 includes nodes 608-614, the hidden layer 604 includes nodes 616-618, and the output layer 606 includes a node 622. In this example, each node in a layer is connected to every node in an adjacent layer. For example, the node 608 in the input layer 602 is connected to both of the nodes 616-618 in the hidden layer 604. Similarly, the node 616 in the hidden layer is connected to all of the nodes 608-614 in the input layer 602 and the node 622 in the output layer 606. Although only one hidden layer is shown for the artificial neural network 600, it has been contemplated that the artificial neural network 600 used to implement the machine learning module 260, and the machine learning module 260 may include as many hidden layers as necessary.

In this example, the artificial neural network 600 receives a set of input values and produces an output value. Each node in the input layer 602 may correspond to a distinct input value. For example, when the artificial neural network 600 is used to implement machine learning module 260, each node in the input layer 602 may correspond to a distinct attribute of an analyzed language usage pattern of a user.

In some embodiments, each of the nodes 616-618 in the hidden layer 604 generates a representation, which may include a mathematical computation (or algorithm) that produces a value based on the input values received from the nodes 608-614. The mathematical computation may include assigning different weights to each of the data values received from the nodes 608-614. The nodes 616 and 618 may include different algorithms and/or different weights assigned to the data variables from the nodes 608-614 such that each of the nodes 616-618 may produce a different value based on the same input values received from the nodes 608-614. In some embodiments, the weights that are initially assigned to the features (or input values) for each of the nodes 616-618 may be randomly generated (e.g., using a computer randomizer). The values generated by the nodes 616 and 618 may be used by the node 622 in the output layer 606 to produce an output value for the artificial neural network 600. When the artificial neural network 600 is used to implement the machine learning module 260, the output value produced by the artificial neural network 600 may indicate a likelihood of an event (e.g., a decision to grant or deny the applicant user's request to obtain the status).

The artificial neural network 600 may be trained by using training data. For example, the training data herein may be the NLP analysis done on the textual data of one or more reference users. By providing training data to the artificial neural network 600, the nodes 616-618 in the hidden layer 604 may be trained (adjusted) such that an optimal output (e.g., determining a value for a threshold) is produced in the output layer 606 based on the training data. By continuously providing different sets of training data, and penalizing the artificial neural network 600 when the output of the artificial neural network 600 is incorrect (e.g., when the determined (predicted) likelihood is inconsistent with whether the event actually occurred for the transaction, etc.), the artificial neural network 600 (and specifically, the representations of the nodes in the hidden layer 604) may be trained (adjusted) to improve its performance in data classification. Adjusting the artificial neural network 600 may include adjusting the weights associated with each node in the hidden layer 604.

Although the above discussions pertain to an artificial neural network as an example of machine learning, it is understood that other types of machine learning methods may also be suitable to implement the various aspects of the present disclosure. For example, support vector machines (SVMs) may be used to implement machine learning. SVMs are a set of related supervised learning methods used for classification and regression. A SVM training algorithm—which may be a non-probabilistic binary linear classifier—may build a model that predicts whether a new example falls into one category or another. As another example, Bayesian networks may be used to implement machine learning. A Bayesian network is an acyclic probabilistic graphical model that represents a set of random variables and their conditional independence with a directed acyclic graph (DAG). The Bayesian network could present the probabilistic relationship between one variable and another variable. Other types of machine learning algorithms are not discussed in detail herein for reasons of simplicity.

Figure 7:
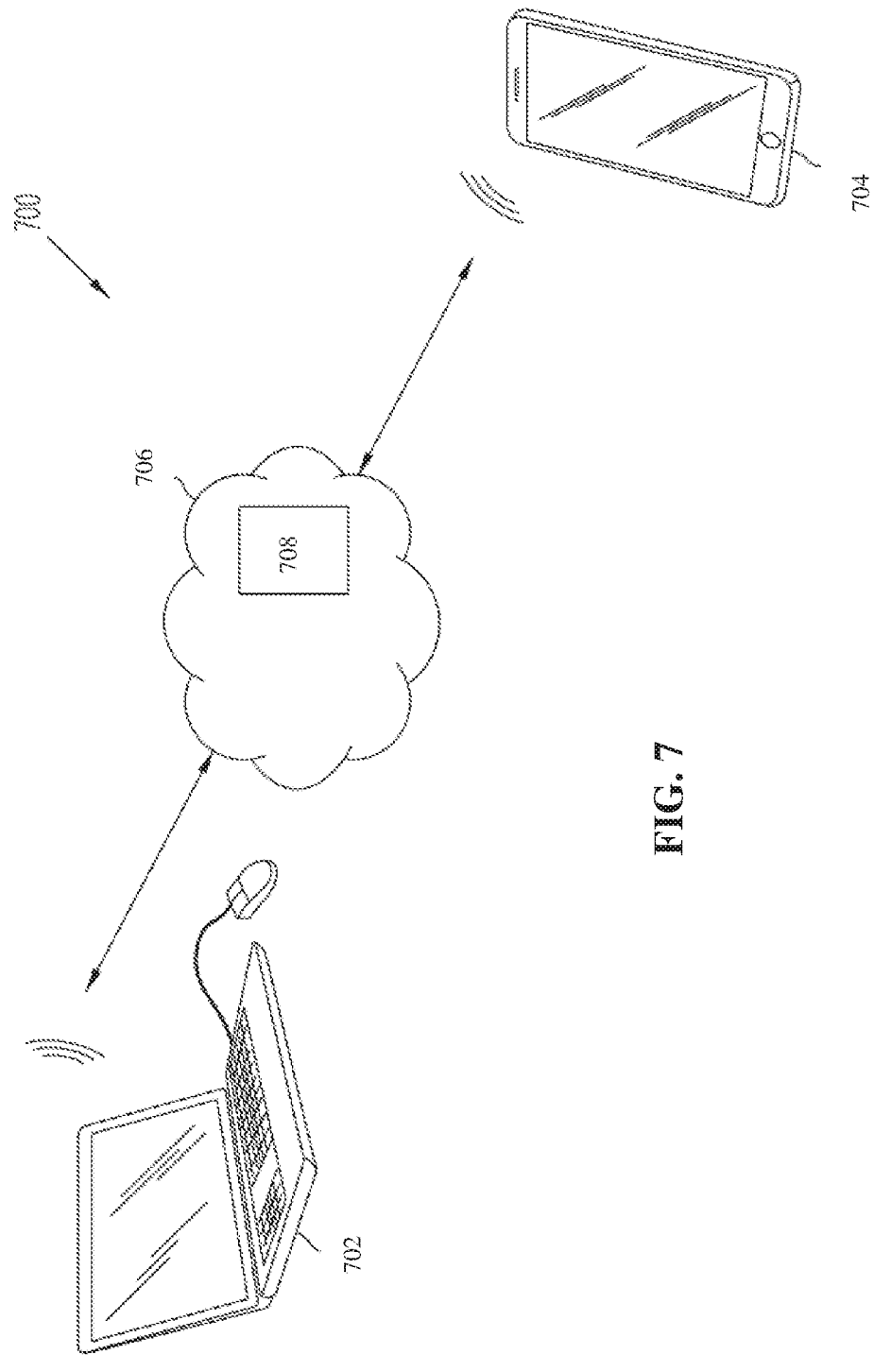
FIG. 7 is a simplified example of a cloud-based computing architecture according to various aspects of the present disclosure.

FIG. 7 illustrates an example cloud-based computing architecture 700, which may also be used to implement various aspects of the present disclosure. The cloud-based computing architecture 700 includes a mobile device 704 (e.g., the user device 110 of FIG. 1) and a computer 702 (e.g., the merchant server 140 or the payment provider server 170), both connected to a computer network 706 (e.g., the Internet or an intranet). In one example, a consumer has the mobile device 704 that is in communication with cloud-based resources 708, which may include one or more computers, such as server computers, with adequate memory resources to handle requests from a variety of users. A given embodiment may divide up the functionality between the mobile device 704 and the cloud-based resources 708 in any appropriate manner. For example, an app on mobile device 704 may perform basic input/output interactions with the user, but a majority of the processing may be performed by the cloud-based resources 708. However, other divisions of responsibility are also possible in various embodiments. In some embodiments, using this cloud architecture, the NLP module 200 may reside on the merchant server 140 or the payment provider server 170, but its functionalities can be accessed or utilized by the mobile device 704, or vice versa.

The cloud-based computing architecture 700 also includes the personal computer 702 in communication with the cloud-based resources 708. In one example, a participating merchant or consumer/user may access information from the cloud-based resources 708 by logging on to a merchant account or a user account at computer 702. The system and method for performing the NLP analysis and the machine learning as discussed above may be implemented at least in part based on the cloud-based computing architecture 700.

It is understood that the various components of cloud-based computing architecture 700 are shown as examples only. For instance, a given user may access the cloud-based resources 708 by a number of devices, not all of the devices being mobile devices. Similarly, a merchant or another user may access the cloud-based resources 708 from any number of suitable mobile or non-mobile devices. Furthermore, the cloud-based resources 708 may accommodate many merchants and users in various embodiments.

FIG. 8 is a flowchart illustrating a method 800 for storing information in an electronic database according to various aspects of the present disclosure. The various steps of the method 800, which are described in greater detail above, may be performed by one or more electronic processors, for example by the processors of a computer of an entity that may include: a payment provider, a business analyst, or a merchant. In some embodiments, at least some of the steps of the method 800 may be performed by the NLP module 200 and/or the machine learning module 260 discussed above.

The method 800 includes a step 810 to receive, from a first user of a social interaction platform, a request to acquire a status. In some embodiments, the request is received from a mobile application corresponding to the electronic payment platform. In some embodiments, the request is a request for a credit application or a credit card.

The method 800 includes a step 820 to access, in response to the receiving of the request, a database that contains first electronic data pertaining to previous interactions between the first user and other entities of the social interaction platform. In some embodiments, the first electronic data contains human language. In some embodiments, the accessed data includes retrieved electronic memos associated with each of the previous interactions over a predefined period of time.

The method 800 includes a step 830 to analyze the first electronic data via one or more Natural Language Processing (NLP) techniques. In some embodiments, the step 830 includes aggregating the first electronic data pertaining to each of the electronic memos and applying the one or more NLP techniques on the aggregated first electronic data. In some embodiments, the step 830 includes analyzing the first electronic data via a counters technique, via a term frequency-inverse document frequency (TF-IDF) technique, or via a word2vec technique. In some embodiments, the step 830 includes identifying an emoji from the first electronic data, translating the emoji into one or more words, and applying the one or more NLP techniques on the one or more words.

The method 800 includes a step 840 to obtain a first result based on the analysis of step 830. The first result corresponds to features regarding the language usage pattern of the first user that is extracted via the one or more NLP techniques.

The method 800 includes a step 850 to execute a machine learning process based at least in part on the first result. In some embodiments, the machine learning process is executed using a Gradient Boosting Machine (GBM) model. In other embodiments, the machine learning process may be executed using a Random Forest model or a Deep Neural Networks model.

The method 800 includes a step 860 to determine, based on the execution of the machine learning process, whether to grant or deny the request received from the first user.

In some embodiments, the social interaction platform comprises an electronic payment platform, and the previous interactions comprise payment transactions between the first user and other users of the electronic payment platform or between the first user and financial institutions.

It is understood that additional method steps may be performed before, during, or after the steps 810-860 discussed above. For example, the method 800 may include a step to remove, from the first electronic data, a set of words that are associated with disability, race, ethnicity, gender, religion, country of origin, or sexual orientation. The NLP analysis is performed on the first electronic data after the set of words has been removed. As another example, the method 800 may further include a step to remove, from the first electronic data, a set of stop words. The NLP analysis is performed on the first electronic data after the set of stop words has been removed. As yet another example, the method 800 may include steps of: retrieving second electronic data pertaining to previous interactions between a second user and other entities of the social interaction platform, the second user already having acquired the status; analyzing the second electronic data via the one or more NLP techniques; and obtaining a second result based on the analyzing of the second electronic data. The machine learning process is executed using the second result as training data. For reasons of simplicity, other additional steps are not discussed in detail herein.

In some embodiments, one or more of the steps 810-860 may also be omitted. For example, the step 810 may be omitted in some embodiments. In other words, the process flow corresponding to 820-860 discussed above need not be initiated in response to receiving a request from a user. Instead, the entity performing the steps 820-860 may evaluate user information without needing to receive a request from the user first. For example, the entity may identify potential users (for which a predefined status may be potentially suitable) for evaluation. Such an identification of the potential users may be based on various factors, including but not limited to: the length of time the user has been active on the social interaction platform, average daily user activity on the social interaction platform, or details of transactions (e.g., monetary amount, type of goods/services involved, the type of counterparties of the transactions) involving the user on the social interaction platform, etc. After identifying a potential user for evaluation, the entity may then determine if the user being evaluated should be granted the predefined status based on the analysis conducted in steps 820-860.

Regardless of how the process flow discussed above is initiated (e.g., in response to a user request, or in the absence of a use request), once the entity determines that the user does qualify for the predefined status, the entity may provide the user with one or more offers corresponding to the predefined status. As non-limiting examples, the offers may include a reduced membership fees for a premium membership status, a fee waiver for a credit card application, or a discount on one or more products or services for sale. Of course, the user will also be provided with an opportunity to accept or reject the offer. If the user rejects the offer, the entity may further perform an analysis to determine a refined offer, an enhanced offer, a different offer that may be more targeted to the user, or an offer that targets a different aspect of the user.

In additional embodiments, the entity may provide the user with the option to opt into an automated offer redemption program. For example, if the user opts into the automatic offer redemption program, the entity may, upon determining that the user qualifies for a predefined status or offer, may automatically enable the predefined status or offer with respect to the user account. In one or more embodiments, the user may have the option to define the types of offers or programs that correspond to an automatic offer redemption. Therefore, the entity may automatically enact or enable certain types of offers automatically on behalf of the user if the user is determined to qualify (and the user has opted in to the automatic redemption program corresponding to the offer), but may prompt for user approval or acceptance for other types of offers that do not correspond to an automatic redemption program that the user has opted in to.

Based on the above discussions, the present disclosure offers several significant advantages over conventional methods and systems. It is understood, however, that not all advantages are necessarily discussed in detail herein, different embodiments may offer different advantages, and that no particular advantage is required for all embodiments. One advantage is improved functionality of a computer. For example, conventional computer systems are only able to determine whether or not to grant an applicant user's request to obtain a predefined status by analyzing external user characteristics such as the applicant user's income, wealth, employment, etc. In some cases, the information provided by the applicant user regarding these external user characteristics may not be completely accurate. For example, they may have been embellished by the user in the hopes of getting a favorable decision. As such, conventional computer systems lack the versatility and adaptability needed to make accurate determinations about the applicant user's request. In contrast, the computer system of the present disclosure employs state-of-the-art NLP techniques to analyze the speech/language usage patterns of the applicant user, and then use machine learning to determine the degree of similarity between the applicant user's language patterns with those of one or more reference users. This allows more accurate and objective decisions to be made with respect to the applicant user's request. In other words, the implementation of the NLP module 200 and the machine learning module 260 on a computer effectively transforms such a computer to a specialty machine that is particularly adept at evaluating the worthiness or suitability of the applicant user with respect to the predefined status. The removal of the stop words and the words associated with disability, gender, race, etc. further reduces the processing power and time required to obtain the result, which again improves the functionality of a computer.

The inventive ideas of the present disclosure are also integrated into a practical application, for example into the NLP module 200 and/or the machine learning module 260 discussed above. Such a practical application can generate an output (e.g., a determination or a score that is used to assist in making a decision) that is easily understood by a human user, and it is useful in many contexts.

It should be appreciated that like reference numerals are used to identify like elements illustrated in one or more of the figures, wherein these labeled figures are for purposes of illustrating embodiments of the present disclosure and not for purposes of limiting the same.

One aspect of the present disclosure involves a method that includes the following steps: receiving, from a first user of a social interaction platform, a request to acquire a status; accessing, in response to the receiving of the request, a database that contains first electronic data pertaining to previous interactions between the first user and other entities of the social interaction platform; analyzing the first electronic data via one or more Natural Language Processing (NLP) techniques; obtaining a first result based on the analyzing; executing a machine learning process based at least in part on the first result; and determining, based on the executing of the machine learning process, whether to grant or deny the request received from the first user; wherein the receiving, the accessing, the analyzing, the obtaining, the executing, or the determining is performed using one or more hardware processors.

Another aspect of the present disclosure involves a system that includes a non-transitory memory and one or more hardware processors coupled to the non-transitory memory and configured to read instructions from the non-transitory memory to cause the system to perform operations comprising: receiving, from an applicant user of a social interaction platform, a request to apply for a predefined status; retrieving, in response to the receiving of the request and from one or more electronic databases, textual data generated by the applicant user as a result of a participation of the applicant user on the social interaction platform; analyzing a language usage pattern of the applicant user at least in part by applying one or more Natural Language Processing (NLP) techniques to the retrieved textual data; determining, via a machine learning process, a degree of similarity between the language usage pattern of the applicant user and a language pattern of a reference user, wherein the reference user has been granted the predefined status or has been denied the predefined status; and granting or denying the request based on the determining.

Yet another aspect of the present disclosure involves a non-transitory machine-readable medium having stored thereon machine-readable instructions executable to cause a machine to perform operations comprising: receiving, from a first user of a social interaction platform, a request to obtain a predefined status; accessing, in response to the receiving of the request, textual data associated with the first user, the textual data being generated by the first user based on interactions of the first user with other users of the social interaction platform; analyzing the textual data via one or more Natural Language Processing (NLP) techniques that comprise a counters technique, a term frequency-inverse document frequency (TF-IDF) technique, or a word2vec technique; generating a first result in response to the analyzing; generating a second result in response to analyzing textual associated with a reference user via the one or more Natural Language Processing (NLP) techniques; performing a machine learning process on the first result, the machine learning process using the second result as training data; and determining, based on the machine learning process, whether to grant or deny the request received from the first user.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method, comprising:
   accessing a language pattern of one or more reference users of an electronic interaction platform, wherein the language pattern was generated via one or more Natural Language Processing (NLP) techniques, and wherein the one or more reference users have acquired a specified status;
   training, using the language pattern of the one or more reference users as training data, a machine learning model;
   accessing electronic data associated with a target user on the electronic interaction platform, wherein the target user comprises a user who does not have the specified status; and
   determining, at least in part via a prediction made by the trained machine learning model based on the electronic data, whether to grant the specified status to the target user;
   wherein the accessing, the training, the accessing, or the determining is performed using a system that includes one or more hardware processors.

2. The method of claim 1, wherein the electronic interaction platform is configured to allow a plurality of users to electronically post and view content, wherein the plurality of the users include the one or more reference users and the target user.

3. The method of claim 2, wherein the language pattern is associated with the content posted by the one or more reference users.

4. The method of claim 2, wherein the content posted by the one or more reference users include graphical but non-textual content.

5. The method of claim 1, further comprising generating, via the one or more NLP techniques and based on the electronic data of the target user, a language pattern of the target user, wherein the prediction is obtained at least in part by inputting the language pattern of the target user to the machine learning model.

6. The method of claim 1, wherein the training comprises training a classification tree model or a regression tree model.

7. The method of claim 1, wherein the specified status is associated with a decision to grant or deny a loan or a credit.

8. The method of claim 1, wherein the language pattern of the one or more reference users is generated based on a same type of data as the electronic data associated with the target user.

9. The method of claim 1, wherein the prediction includes a score, and wherein the determining is based on whether the score meets a threshold score.

10. The method of claim 1, wherein the NLP technique comprises a technique to vectorize a plurality of words in the language pattern.

11. The method of claim 1, wherein the NLP technique generates a numerical statistic that reflects a relative importance of one or more words in the language pattern.

12. A system, comprising:
a natural language processing (NLP) module configured to perform operations that include:
accessing first electronic data of one or more reference users of an electronic interaction platform, wherein the electronic interaction platform facilitates electronic communications among a plurality of users that include the one or more reference users, and wherein the one or more reference users have been granted a specified status;
accessing second electronic data of an applicant user of the plurality of users of the electronic interaction platform, wherein the applicant user is applying for the specified status;
generating a first NLP analysis result based on the first electronic data for the one or more references user; and
generating a second NLP analysis result based on the second electronic data for the applicant user;
a machine learning module configured to perform operations that include:
training a machine learning model at least in part by using the first NLP analysis result as training data; and
generating an output at least in part by inputting the second NLP analysis result into the trained machine learning model, wherein the output indicates a degree of similarity between the first electronic data and the second electronic data; and
a decision module configured to determine, based at least in part on the output generated by the machine learning module, whether to grant or deny the specified status for the applicant user.

13. The system of claim 12, wherein the first electronic data or the second electronic data comprises an electronic message, an electronic memorandum, an electronic chat record, an electronic status update, or an electronic record of a transaction.

14. The system of claim 12, wherein:
the first NLP analysis result is associated with a first language pattern of the one or more reference users; and
the second NLP analysis result is associated with a second language pattern of the applicant user.

15. The system of claim 14, wherein the output comprises a score that indicates a degree of similarity between the first language pattern and the second language pattern.

16. The system of claim 12, wherein the first electronic data or the second electronic data contains an audio or an image.

17. The system of claim 12, further comprising a meta data scoring module configured to generate a score for the applicant user based on meta data associated with the applicant user, the meta data indicating a type of the specified status, a history of the applicant user with the electronic interaction platform, or a transaction record of the applicant user, wherein a determination of whether to grant or deny the specified status for the applicant user from the decision module is based further on the score generated by the meta data scoring module.

18. A non-transitory machine-readable medium having stored thereon machine-readable instructions executable to cause a machine to perform operations comprising:
performing a first Natural Language Processing (NLP) process to first electronic interaction data generated by one or more first users of an online platform, wherein the one or more first users have been granted a specified status;
training, using a first result of the first NLP process as training data, a machine learning model;
performing a second NLP process to second electronic interaction data generated by a second user of the online platform, wherein the second user has requested, but has not been granted, the specified status, and wherein the first electronic interaction data and the second electronic interaction data each contain a plurality of words of a human language;
determining, at least in part by inputting a result of the second NLP process to the machine learning model, a similarity between the second user and at least one of the one or more first users; and
granting or denying the specified status to the second user based at least in part on the determining.

19. The non-transitory machine-readable medium of claim 18, wherein the first electronic interaction data or the second electronic interaction data further contains non-textual data.

20. The non-transitory machine-readable medium of claim 18, wherein:
the first electronic interaction data or the second electronic interaction data is associated with one or more electronic postings or transaction records of the one or more first users or the second user; and
the first NLP process or the second NLP process comprises a word2vec process performed on the one or more electronic postings or the transaction records.

* * * * *